UNITED STATES PATENT OFFICE.

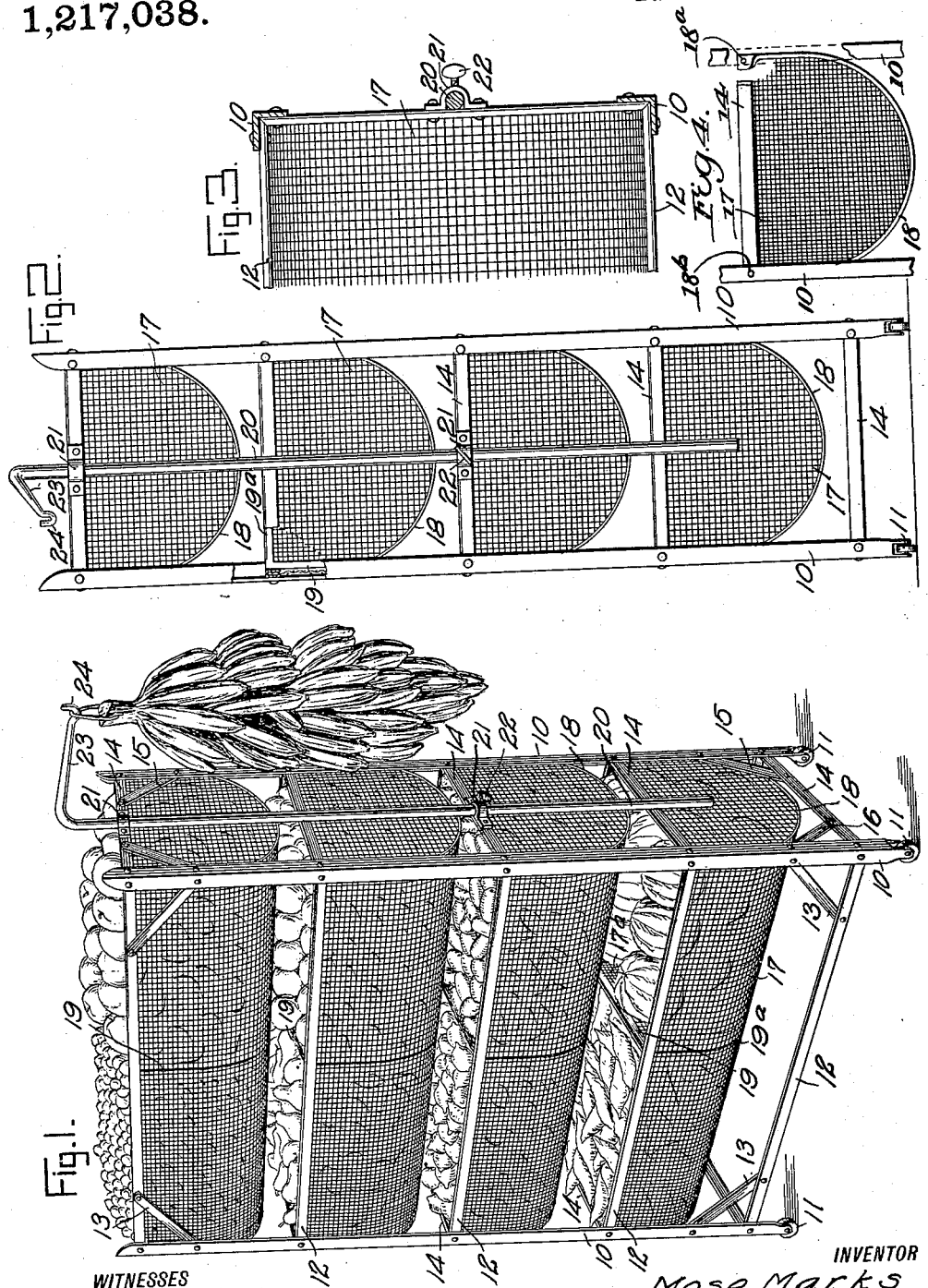

MOSE MARKS, OF BERKELEY, CALIFORNIA.

FRUIT-STAND.

1,217,038.   Specification of Letters Patent.   Patented Feb. 20, 1917.

Application filed October 16, 1915. Serial No. 56,244.

*To all whom it may concern:*

Be it known that I, MOSE MARKS, a citizen of the United States, and a resident of Berkeley, in the county of Alameda and State of California, have invented a new and Improved Fruit-Stand, of which the following is a full, clear, and exact description.

The prime object of my invention is to provide a sanitary fruit stand in which various fruits may be arranged in a manner affording ready access thereto.

The invention also has in view the production of a fruit stand of strong and durable construction and inexpensive to manufacture.

The invention will be more particularly explained in the specific description following.

Reference is to be had to the accompanying drawings forming a part of this specification in which similar reference characters indicate corresponding parts in all the views.

Figure 1 is a perspective view of a fruit stand embodying my invention;

Fig. 2 is an end view thereof, part broken out; and

Fig. 3 is a fragmentary sectional plan view.

Fig. 4 is a fragmentary end view.

In constructing a stand in accordance with my invention, a frame is provided comprising corner posts 10, which preferably, are of angle iron, and provided with rollers 11. The side posts are connected by side bars 12, and there may be employed corner braces 13, between the side bars and the posts 10. On a level with the side bars 12, are end cross-bars 14, said end bars and side bars being riveted to the angle posts 10. Additional corner braces 15, 16, are provided, riveted respectively to the cross-bars 14 and posts 10.

In connection with the frame, I provide one or more baskets 17, of woven wire or equivalent material, which will permit the circulation of air through the baskets and prevent the accumulation of dust therein. The side bars 12, and the cross-bars 14, form top frames for the baskets 17, from which frames the wire netting is hung. At the ends, U-shaped frames 18, are provided for each basket, these being in fixed relation to the top frame members 14, of the baskets. One manner of securing the upper ends of the U-shaped end frames 18 is shown in Fig. 4 in which the ends thereof are brought against the bars 14 and formed with holes 18$^a$ to be rigidly secured in place by bolts or rivets 18$^b$. In addition I prefer to provide one or more partitions 17$^a$, of woven wire, said partitions each having a frame consisting of a top bar 19, extending transversely between the side bars 12, and a U-shaped frame member 19$^a$, extending around the bottom and sides of the basket and in fixed relation to the top bar 19.

On an end of the stand I provide an upright rod 20, which is adapted to turn in bearings 21, on certain of the cross bars 14, one of said bearings having a set screw 22, for holding the rod in adjusted position. The upper end of the rod 20, is formed with a laterally extending arm 23, which terminates in an up-turned hook 24, on which a bunch of bananas may be hung as indicated in Fig. 1. When it is not desired to hang bananas on the hook 24, the rod 20, may be turned inwardly over the top of the frame, thereby to offer no obstruction at the exterior.

The basket, or baskets, provide for a variety of fruits and vegetables properly arranged in a sanitary manner and accessible, and with the provision for supporting the bananas; a stand of comparatively small dimensions will serve for holding the maximum quantity of fruit or vegetables.

Having thus described my invention, I claim as new, and desire to secure by Letters Patent.

1. In a stand for fruits and vegetables, a frame including corner posts, and side bars and end bars connecting said posts; and a foraminous basket U-shaped in cross section, and supported on said frame, said basket including U-shaped frame members in the basket at the ends beneath the end bars of the main frame, a U-shaped frame member in the basket between the ends, a foraminous partition secured to the last-mentioned U-shaped frame member, and a top cross bar at said partition and connecting the upper ends of the said last-mentioned U-shaped member.

2. A stand for fruits and vegetables, comprising a frame having corner posts, side bars and end bars connecting the corner posts, and a U-shaped foraminous basket directly secured to the said side bars and end bars, the said side bars and end bars forming the top frame for the basket, the basket including U-shaped frame members at the
5 ends and secured to and depending from the said end bars of the top frame.

In testimony whereof I have signed my name to this specification in the presence of two subscribing witnesses.

MOSE MARKS.

Witnesses:
W. T. INGIVERSAN,
J. E. LANNON.

Copies of this patent may be obtained for five cents each, by addressing the "Commissioner of Patents, Washington, D. C."